United States Patent
Conner et al.

(10) Patent No.: US 9,507,102 B2
(45) Date of Patent: Nov. 29, 2016

(54) CONNECTOR ASSEMBLIES AND METHODS FOR PROVIDING SEALING AND STRAIN-RELIEF

(71) Applicant: CORNING OPTICAL COMMUNICATIONS LLC, Hickory, NC (US)

(72) Inventors: Mark Edward Conner, Granite Falls, NC (US); Joseph Clinton Jensen, Lawndale, NC (US); Michael Wimmer, Berlin (DE)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/925,129

(22) Filed: Oct. 28, 2015

(65) Prior Publication Data
US 2016/0047994 A1  Feb. 18, 2016

Related U.S. Application Data

(63) Continuation of application No. PCT/US2014/035981, filed on Apr. 30, 2014.

(60) Provisional application No. 61/818,687, filed on May 2, 2013.

(51) Int. Cl.
G02B 6/36 (2006.01)
G02B 6/38 (2006.01)
(Continued)

(52) U.S. Cl.
CPC .......... *G02B 6/3887* (2013.01); *G02B 6/3825* (2013.01); *H01R 13/5202* (2013.01); *H01R 13/582* (2013.01); *H01R 43/16* (2013.01); *H01R 13/5205* (2013.01); *H01R 13/5825* (2013.01)

(58) Field of Classification Search
CPC G02B 6/3879; G02B 6/3849; G02B 6/3894; G02B 6/3887; G02B 6/3825; H01R 13/5202; H01R 13/582; H01R 13/5205; H01R 13/5825; H01R 43/116
USPC ........................................ 385/53, 56, 86–87
See application file for complete search history.

(56) References Cited

U.S. PATENT DOCUMENTS 5,094,552 A * 3/1992 Monroe ............... G02B 6/3887
385/76
6,017,243 A  1/2000 Castaldo
(Continued)

FOREIGN PATENT DOCUMENTS

CN 101248382 A 8/2008
CN 101533137 A 9/2009
(Continued)

OTHER PUBLICATIONS

US 7,481,586, 01/2009, Lu (withdrawn)
(Continued)

*Primary Examiner* — Ryan Lepisto
*Assistant Examiner* — Guy Anderson

(57) ABSTRACT

Connector assemblies and methods are disclosed for providing sealing and strain-relief. In one embodiment, the connector assembly includes a cable assembly having an overmold portion, an inner housing, and a coupling body. The inner housing includes a sealing element for providing sealing from environmental elements and a crank for providing strain-relief for the connector assembly and inhibiting pulling forces on the cable assembly from being transmitted to the connector of the cable assembly.

26 Claims, 8 Drawing Sheets

(51) Int. Cl.
  *H01R 43/16* (2006.01)
  *H01R 13/52* (2006.01)
  *H01R 13/58* (2006.01)

(56) References Cited

U.S. PATENT DOCUMENTS

| | | | |
|---|---|---|---|
| 6,234,683 B1 * | 5/2001 | Waldron | G02B 6/383 385/77 |
| 6,546,175 B1 | 4/2003 | Wagman et al. | |
| 6,648,520 B2 | 11/2003 | McDonald et al. | |
| 6,785,450 B2 | 8/2004 | Wagman et al. | |
| 6,899,467 B2 | 5/2005 | McDonald et al. | |
| 7,090,406 B2 | 8/2006 | Melton et al. | |
| 7,090,407 B2 | 8/2006 | Melton et al. | |
| 7,113,679 B2 | 9/2006 | Melton et al. | |
| 7,137,742 B2 | 11/2006 | Theuerkorn et al. | |
| 7,244,066 B2 | 7/2007 | Theuerkorn | |
| 7,264,402 B2 | 9/2007 | Theuerkorn et al. | |
| 7,303,418 B2 | 12/2007 | O'Connor | |
| 7,325,980 B2 | 2/2008 | Pepe | |
| 7,338,214 B1 | 3/2008 | Gurreri et al. | |
| 7,467,896 B2 | 12/2008 | Melton et al. | |
| 7,556,437 B2 | 7/2009 | Droege | |
| 7,568,844 B2 | 8/2009 | Luther et al. | |
| 7,572,065 B2 | 8/2009 | Lu et al. | |
| 7,591,595 B2 | 9/2009 | Lu et al. | |
| 7,609,925 B2 | 10/2009 | Gronvall et al. | |
| 7,614,797 B2 | 11/2009 | Lu et al. | |
| 7,654,747 B2 | 2/2010 | Theuerkorn et al. | |
| 7,677,814 B2 | 3/2010 | Lu et al. | |
| 7,686,519 B2 | 3/2010 | Lu | |
| 7,722,258 B2 | 5/2010 | Lu et al. | |
| 7,738,759 B2 | 6/2010 | Parikh et al. | |
| 7,744,286 B2 | 6/2010 | Lu et al. | |
| 7,744,288 B2 | 6/2010 | Lu et al. | |
| 7,785,015 B2 | 8/2010 | Melton et al. | |
| 7,785,019 B2 | 8/2010 | Lewallen et al. | |
| 7,794,155 B1 | 9/2010 | Haley et al. | |
| 7,837,396 B2 | 11/2010 | Marcouiller | |
| 7,881,576 B2 | 2/2011 | Melton et al. | |
| 7,918,609 B2 | 4/2011 | Melton et al. | |
| 7,959,361 B2 | 6/2011 | Lu et al. | |
| RE42,522 E | 7/2011 | Zimmel et al. | |
| 7,972,067 B2 | 7/2011 | Haley et al. | |
| 8,038,356 B2 | 10/2011 | Marcouiller et al. | |
| 8,128,294 B2 | 3/2012 | Lu et al. | |
| 8,137,002 B2 | 3/2012 | Lu et al. | |
| 8,170,391 B2 | 5/2012 | Beck | |
| 8,272,792 B2 | 9/2012 | Coleman et al. | |
| 8,285,096 B2 | 10/2012 | Coleman et al. | |
| 8,303,193 B2 | 11/2012 | Coleman et al. | |
| 8,506,173 B2 | 8/2013 | Lewallen et al. | |
| 8,556,520 B2 | 10/2013 | Elenbaas et al. | |
| 2005/0064752 A1 | 3/2005 | Serino | |
| 2006/0045428 A1 | 3/2006 | Theuerkorn et al. | |
| 2006/0172578 A1 | 8/2006 | Parsons | |
| 2008/0253729 A1 | 10/2008 | Gronvall et al. | |
| 2009/0304335 A1 * | 12/2009 | Marcouiller | G02B 6/3869 385/78 |
| 2010/0086260 A1 | 4/2010 | Parikh et al. | |
| 2010/0151721 A1 | 6/2010 | Tyler | |
| 2010/0239216 A1 | 9/2010 | Paschal et al. | |
| 2010/0322584 A1 | 12/2010 | Kowalczyk et al. | |
| 2010/0329627 A1 * | 12/2010 | Donaldson | G02B 6/3887 385/137 |
| 2011/0013871 A1 | 1/2011 | Lu et al. | |
| 2011/0075971 A1 | 3/2011 | Elenbaas et al. | |
| 2011/0150398 A1 | 6/2011 | Zimmel et al. | |
| 2011/0150403 A1 | 6/2011 | Kachmar et al. | |
| 2011/0189876 A1 | 8/2011 | Schneider | |
| 2012/0051710 A1 | 3/2012 | Zeng et al. | |
| 2013/0029541 A1 | 1/2013 | Chiarelli et al. | |

FOREIGN PATENT DOCUMENTS

| | | |
|---|---|---|
| CN | 101636679 B | 4/2012 |
| DE | 102010039715 B9 | 8/2012 |
| EP | 0431978 A2 | 6/1991 |
| EP | 2239605 A1 | 10/2010 |
| WO | 2010051334 A1 | 5/2010 |
| WO | WO2013025855 | 2/2013 |
| WO | 2013179376 A1 | 12/2013 |

OTHER PUBLICATIONS

Tyco FullAXS Connector System, Application Specification 114-32032, Rev B, Aug. 28, 2012, 9 pages.
Patent Cooperation Treaty International Search Report, Application No. PCT/US2014/035981, Nov. 19, 2014, 4 pages.
Chinese Search Report, Application No. 2012800399063, Jan. 29, 2015, 2 pages.
European Search Report, Application No. 12823528.0-1553, Feb. 12, 2015, 6 pages.
Written Opinion issued in corresponding PCT Appln. No. PCT/US2014/035981, dated Nov. 19, 2014 (4 pgs.).

* cited by examiner

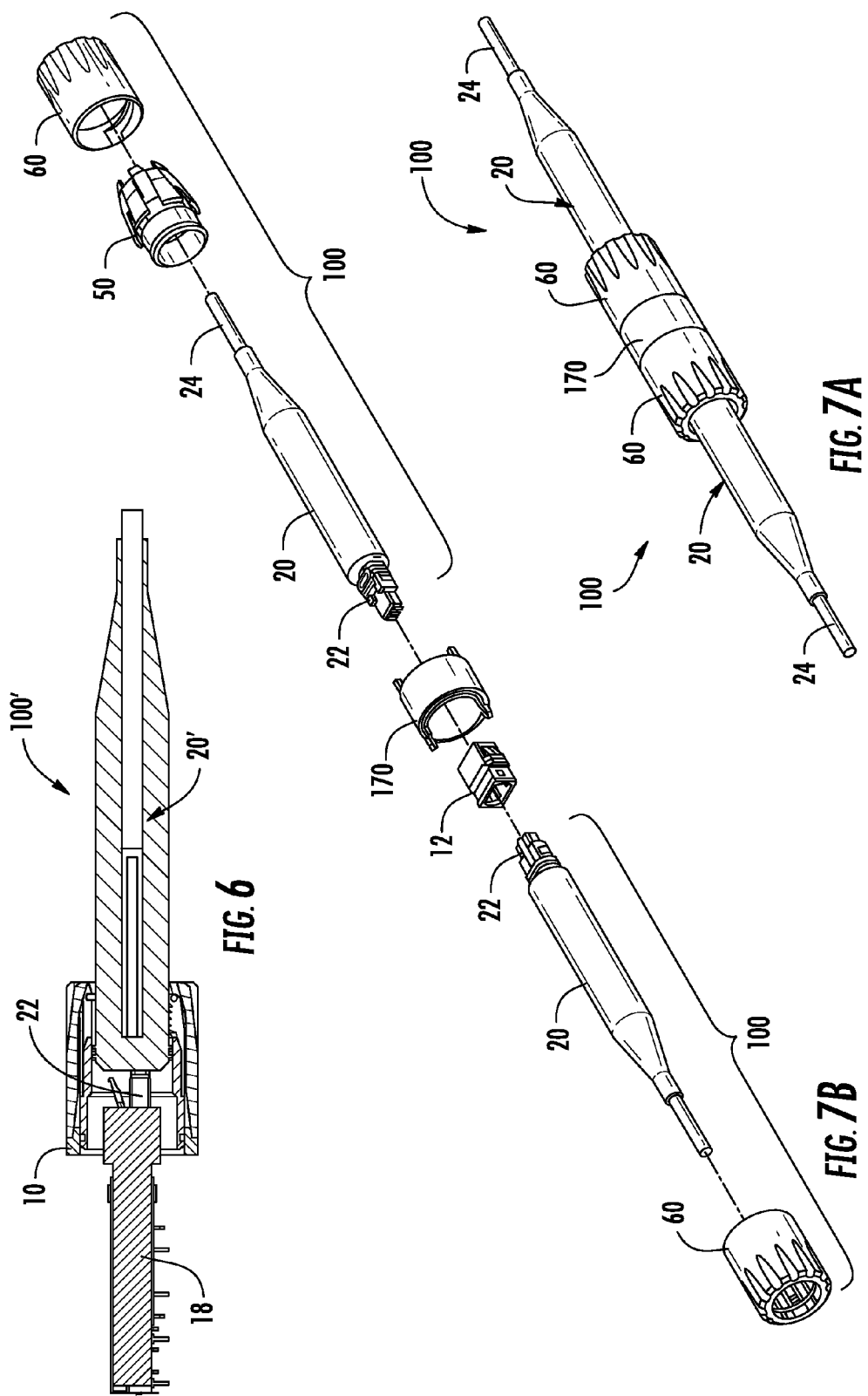

CONNECTOR ASSEMBLIES AND METHODS FOR PROVIDING SEALING AND STRAIN-RELIEF

PRIORITY APPLICATIONS

This application is a continuation of International Application No. PCT/US14/35981, filed on Apr. 30, 2014, which claims the benefit of priority to U.S. Application No. 61/818,687, filed on May 2, 2013, both applications being incorporated herein by reference.

FIELD

The disclosure is directed to connector assemblies and methods that provide sealing and strain-relief.

BACKGROUND

As electronic devices such as cell phones and tablets move toward operation at faster data rates and consume more bandwidth the communication networks such as wireless networks that serve these electronic devices will continue to require more capacity. Consequently, more and newer equipment such as radio heads are being deployed on cell towers for handling the increase in bandwidth demand. The connection of radio heads on the cell towers of the communication network has switched to optical fibers since they are lighter and can handle more bandwidth than copper cables and are not subject to electrical interference. However, there are challenges for providing optical connectivity to equipment at the bulkhead wall such as radio heads. For instance, the connection interface must be robust and seal the radio head from outdoor environmental effects and inhibit pulling forces from being transferred to the connection location. Moreover, the connections should be quick, easy and reliable since the connections are made in aerial locations high above the ground and may requires moves, adds and changes during their lifetime as networks are improved.

There is an unresolved need for connectors suitable for attaching to devices that provide a robust solution while allowing quick and easy moves, adds and changes to the network or device.

SUMMARY

The disclosure is directed to connector assembly including a cable assembly comprising a cable with an overmold portion and a connector, an inner housing assembly comprising a sealing element and a crank for providing strain-relief. The sealing element comprising a longitudinal passageway extending from a front end to a rear end for receiving a part of the overmold portion within the longitudinal passageway. The connector assembly also comprises a coupling body with a passageway that fits about part of the inner housing. The passageway comprises an attachment feature for securing the coupling body and a clamping feature for engaging the crank.

The disclosure is also directed to a connector assembly including a cable assembly comprising a cable with an overmold portion and a connector, an inner housing assembly comprising a sealing element and a crank for providing strain-relief. The sealing element comprising a longitudinal passageway extending from a front end to a rear end for receiving a part of the overmold portion within the longitudinal passageway. The crank includes a plurality of arms connected by a ring and the sealing element has a plurality of fingers near a rear end. The ring of the crank fits into the longitudinal passageway of the sealing element for attaching the crank to the sealing element and the plurality of arms of the crank are at least partially interleaved between the plurality of fingers on the sealing element. The connector assembly also comprises a coupling body having a passageway that fits about part of the inner housing. The passageway comprises an attachment feature for securing the coupling body and a clamping feature for engaging the crank.

The disclosure is also directed to a method of attaching a connector assembly including providing a cable assembly comprising a cable with an overmold portion and a connector, providing an inner housing assembly comprising a sealing element and a crank. The sealing element comprising a longitudinal passageway extending from a front end to a rear end, and sliding the inner housing assembly about a part of the overmold portion so it is within the longitudinal passageway of the sealing element. Providing a coupling body comprising a passageway that fits about part of the inner housing, wherein the passageway comprises an attachment feature and clamping feature, and sliding the coupling body about the inner housing so that the clamping feature engages the crank onto the overmold portion, and securing the coupling body using the attachment feature. The method may include other steps as discussed herein.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIG. 6 is a cross-sectional view of a connector assembly having another optical connector type attached to a transceiver at the bulkhead adapter;

FIGS. 7A and 7B respectively depict an assembled and exploded view of the connector assembly of FIG. 1 being attached to a second connector assembly using an adapter housing;

DETAILED DESCRIPTION

Reference will now be made in detail to the embodiments of the disclosure, examples of which are illustrated in the accompanying drawings. Whenever possible, like reference numbers will be used to refer to like components or parts.

The connector assemblies and methods disclosed herein enable reliable and rugged optical and/or electrical connections at a bulkhead or other suitable location. The concepts include connector assemblies that provide connector sealing for protection from environmental effects along with robust strain-relief for protecting the connector from external forces that may act on the cable. By way of example, the connectors assemblies may be attached to a bulkhead adapter such as may be used on a connection of a radio head of a wireless network. Further, the concepts of the connector assemblies may be used in other applications or locations such as in-line connection with another connector, optical backplanes, OEM and other equipment. The connector assemblies and methods according to the concepts disclosed provide easy connectivity with a footprint that is scalable and/or adaptable for different applications or installation. Further, the concepts provide simple connector assemblies that may be mated and unmated for moves, adds and/or changes in the network since they are relatively easy to connect and disconnect.

Figure 1:
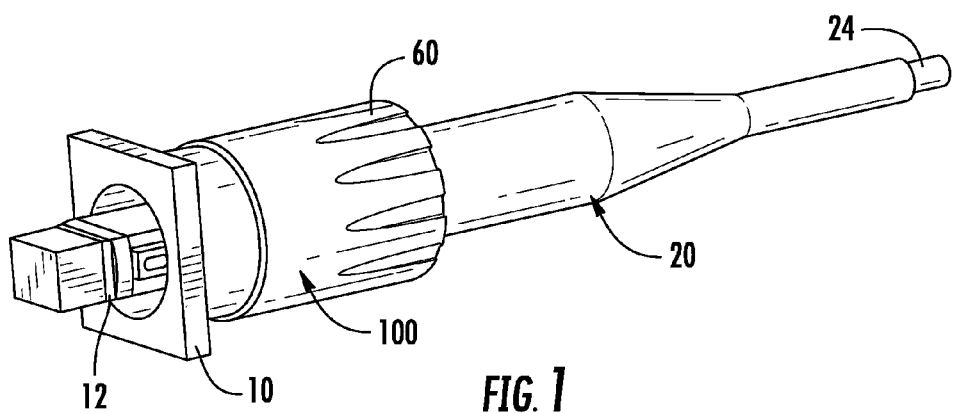
FIG. 1 is a perspective view of an explanatory connector assembly according to the concepts disclosed herein attached to a bulkhead adapter.
Figure 2:
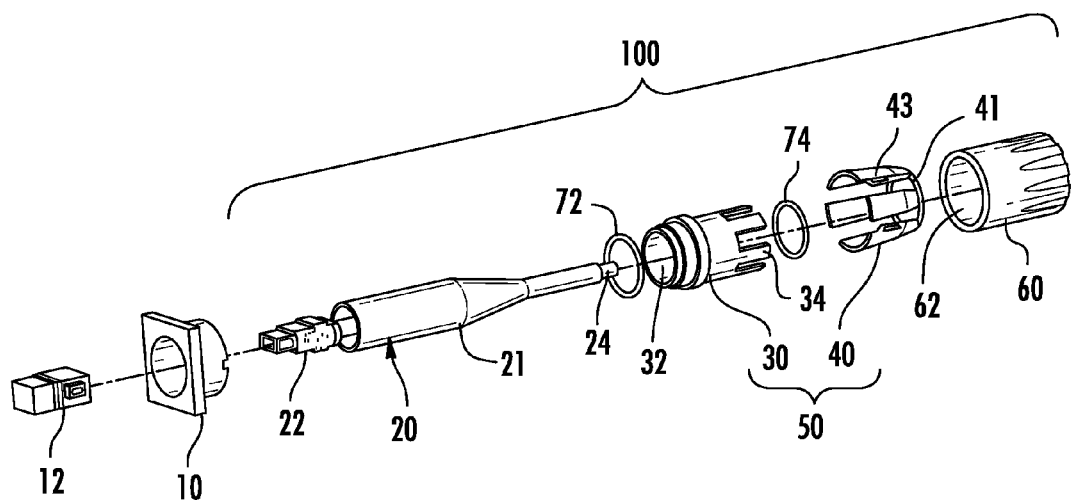
FIG. 2 is a partially exploded view of the connector assembly of FIG. 1.

FIG. 1 is a perspective view of an explanatory connector assembly 100 according to the concepts disclosed herein attached to a bulkhead adapter 10 and FIG. 2 is a partially exploded view of the connector assembly 100 and bulkhead adapter 10. By way of example, the bulkhead adapter 10 may be mounted to a wall of a housing (not shown) such as a wireless radio head mounted on a cell tower or other equipment where a connection is required. The concepts of the connector assembly 100 may be used with any suitable connector such as an optical connector, an electrical connector or a hybrid optical-electrical connector. By way of example, the connection may be between an optical connector and a transceiver, two optical connectors, two electrical connectors, etc. The connection interface may also include other components such as an optical connector adapter or the like that does not form any part of the connector assembly, but instead aids in making the connection with the connector assemblies. In this embodiment, the connector assembly is shown with an optical connector such as a multi-fiber optical connector, but other embodiments may have one or more single fiber connectors such as a two LC optical connectors as desired.

As best shown in FIG. 2, connector assembly 100 includes a cable assembly 20, an inner housing assembly 50, and a coupling body 60. The inner housing assembly 50 includes a sealing element 30 along with a crank 40 for providing strain-relief for the connector assembly 100. Sealing element 30 provides a sealing function for connector assembly 100 by inhibiting environmental elements such as dust, debris and moisture from reaching the connector 22 and/or connection interface near the bulkhead adapter. As shown, crank 40 has a plurality of arms 43 connected by a ring 41. The plurality of arms 43 are deflectable and used for providing strain-relief. The use of two different components for the inner housing assembly 50 allows the sealing function to be performed by the sealing element 30 and the strain-relief function to be performed by the crank 40. Coupling body 60 includes a passageway 62 that fits about part of the inner housing 50 when assembled such as shown in FIG. 1. Coupling body 60 also includes an attachment feature 64 (FIG. 5A) for securing the coupling body along with a clamping feature 66 (FIG. 3) for engaging the crank 40.

The attachment feature 64 of coupling body 60 may be any suitable attachment structure desired and is directed by the type of bulkhead adapter or other mounting structure used for the given application. In this explanatory example, the bulkhead adapter has flanges (not numbered) that extend outward and include protrusions for attachment to the coupling body. For instance, the coupling body 60 includes attachment features 64 configured as one or more grooves that engage the protrusion on the flanges of the bulkhead adapter 10 and secure the connector assembly when the coupling body 60 is rotated (i.e., a quick-turn attachment). Of course, other attachment features are possible using the concepts disclosed such as threads or the like. In this embodiment, coupling body 60 also includes clamping feature 66 formed in the passageway 62 (e.g., on the inner surface) of the coupling body 60. More specifically, the clamping feature 66 (FIG. 3) is a tapered region in the passageway 62 of connector body 60. The connector assembly 100 may also include one or more O-rings. By way of example and not limitation, connector assembly 100 includes a first O-ring 72 and a second O-ring 74; however, one or more of the O-rings may be replaced by other structure as discussed herein.

Cable assembly 20 of connector assembly 100 has one or more connectors 22 mounted on the end of the cable 24 along with an overmold portion 21 disposed about a portion of the cable 24. The overmold portion 21 may have any suitable size/shape and aids in providing strain-relief to the connector 22 as discussed herein and may also aid in sealing. For instance, the rear end (i.e., tapered and stepped down portions) of the overmold portion 21 may also have a size and shape for providing bending strain relief to the portion of the cable 24 that extends to the rear of the coupling body 60 such as shown in FIG. 1. Cable 24 may be any suitable cable design and may include optical waveguides and/or electrical conductors as desired for the given connector. Cable 24 may also have strength members that are attached to the connector and/or to the overmold as desired for providing a robust cabling solution. Although, the overmold 21 is shown having a straight through configuration for simplicity, the overmold portion may have any suitable angle with respect to the exiting cable such as 45, 60 or 90 degrees, but still other angles are possible.

Figure 5A:
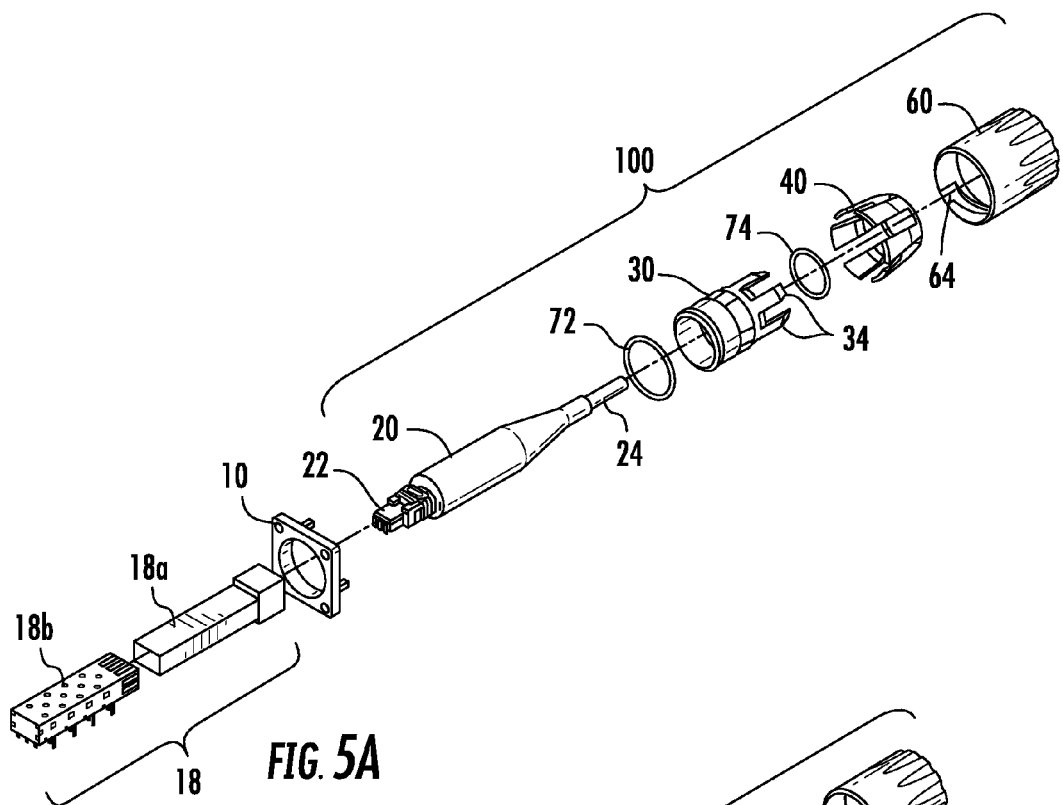
FIGS. 5A-5C depict the connector assembly of FIG. 1 being connected to another device at the bulkhead adapter.
Figure 5B:
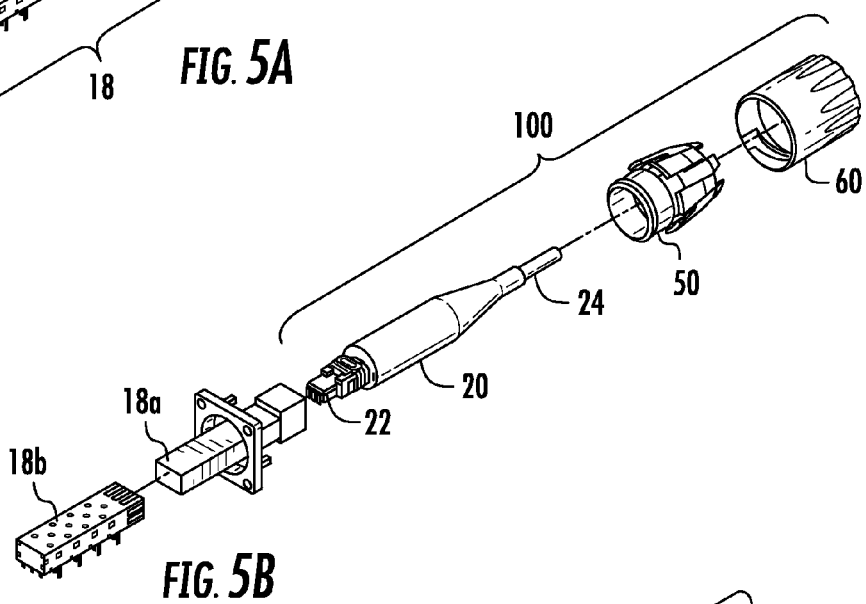

Inner housing assembly 50 includes sealing element 30 and crank 40 and when assembled crank 40 attaches to sealing element 30 such as shown in FIG. 5B. As shown in FIG. 2, sealing element 30 has a plurality of fingers 34 at the rear end. The plurality of fingers 34 are spaced apart by openings (not numbered) and generally extend rearward. The fingers 34 of sealing element 30 and arms 43 of cooperate for assembly. Specifically, the crank 40 has the plurality of arms 43 connected by ring 41 and is assembled to the sealing element 30 by fitting the ring 41 into the longitudinal passageway of the sealing element 30 so that so that the plurality of arms 43 of crank 40 are at least partially interleaved between the fingers 34 on the sealing element. In other words, the arms 43 of the crank 40 are aligned with the openings between the fingers 34 of the sealing element 30 for inserting the ring 41 of the crank into the longitudinal passageway 32 of the sealing element 30 during assembly of the inner housing 50.

Sealing for the connector assembly is provided by sealing element 30. Specifically, the sealing element 30 has a longitudinal passageway 32 extending from a front end (not numbered) to a rear end (not numbered) for receiving a part of the overmold portion 21 of cable assembly 20 within the longitudinal passageway 32. Stated another way, the longitudinal passageway 32 of sealing element 30 is suitable sized so that it can slide-up and about the overmold portion 21 of cable assembly 20 and engage the bulkhead adapter 10 but still allow for sealing. Generally speaking, the sealing function in this embodiment is provided as the sealing element is slide-up on the overmold portion and seated into the bulkhead adapter. For instance, first O-ring 72 is provided on the outer surface (i.e., outer barrel) of the sealing element 30 near the front end on a portion of the sealing element 30 that is inserted into the passageway of the bulkhead adapter. Consequently, first O-ring 72 provides a seal between the sealing element 30 and the passageway of the bulkhead adapter 10 as it is seated into the bulkhead adapter. However, other embodiments of the connector assembly could eliminate the first O-ring 72 on the connector assembly by providing the O-ring within the passageway of the bulkhead adapter instead. Second O-ring 74 is disposed on an inner surface of the sealing element in this embodiment. Second O-ring 74 provides a seal between the sealing element 30 and the overmold portion 21 of the cable assembly 20 as it is slid about the overmold portion 21. As with the first O-ring 72, other embodiments of the connector assembly could eliminate the second O-ring 74 on the connector assembly by providing the overmold portion 21 with a sealing ridge (i.e., an annular ridge or ring that is integrally formed with the overmold portion and protrudes from the surface) that seals on the inner surface of the sealing element 30. Thus, the O-rings are optional for the connector assembly depending on the variation used.

Figure 3:
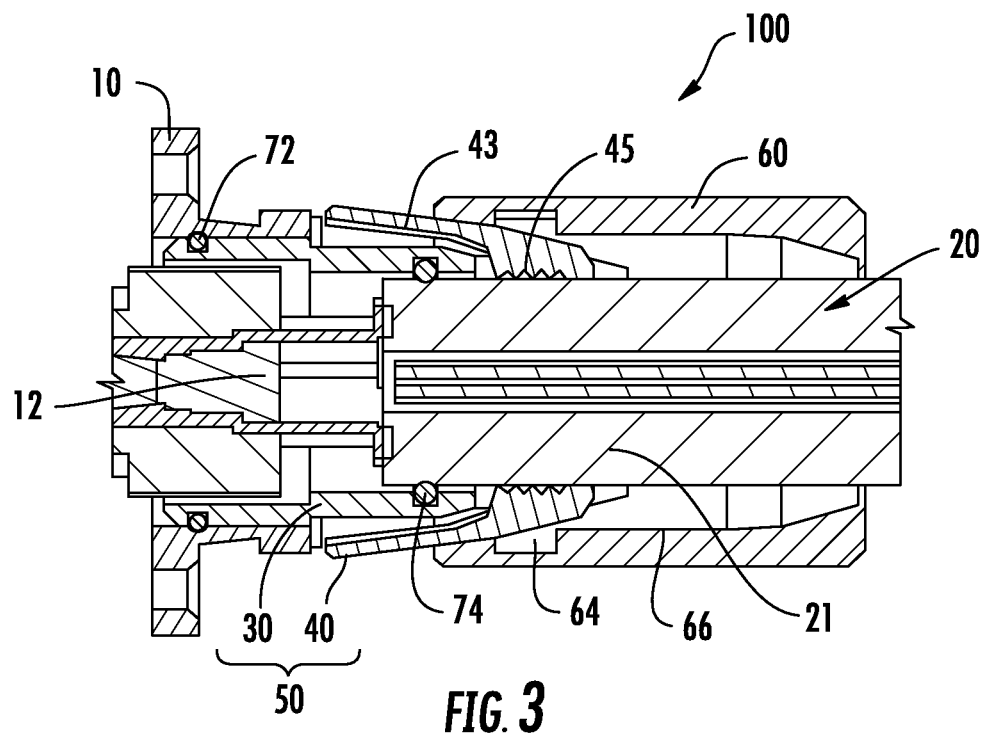
FIGS. 3 and 4 are cross-sectional views showing the connector assembly being attached to the bulkhead adapter with FIG. 3 showing the coupling body before being slid-up about the inner housing and attached to the bulkhead adapter and FIG. 4 shows the coupling body slid about the inner housing and secured to the bulkhead adapter using the attachment feature so that the clamping features engage the crank onto the overmold portion and provide strain-relief.
Figure 4:
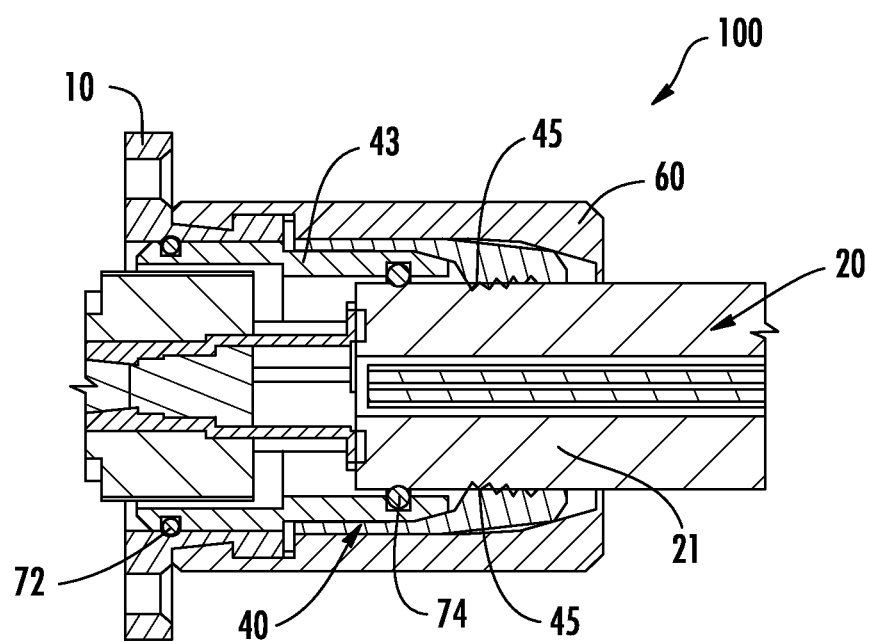

FIGS. 3 and 4 are cross-sectional views of connector assembly 100 being attached to the bulkhead adapter 10 for showing the strain-relief operation. As shown in FIG. 3, the connection of connector 22 is made and then the inner housing may be positioned relative to the bulkhead adapter. In this case, since the ring 41 of crank 40 fits into the passageway 32 of sealing element 30 when assembled, the inner housing assembly 50 may be positioned in a single operation. FIG. 3 shows the connector assembly 100 with the inner housing 50 positioned about part of the overmold portion 21 of cable assembly 20 and engaging bulkhead adapter 10, but coupling body 60 not yet attached to the bulkhead adapter 10. At this point, the sealing function is performed by sealing element 30, but the plurality of arms 43 of crank 40 are not yet deflected for providing strain-relief by gripping the overmold portion 21 of cable assembly 20. Stated another way, the plurality of arms 43 are still in a relaxed position and one or more optional teeth 45 on the arms 43 are not yet engaged into the overmold portion 21 for providing strain-relief for the connector assembly 100. FIG. 4 shows the coupling body 60 slid toward bulkhead adapter 10 and about the inner housing 50 so that the clamping features 66 of the coupling body 60 engage the arms 43 of crank 40 onto the overmold portion and secured to the bulkhead adapter using the attachment feature 64. As shown, the one or more teeth 45 on arms 43 "bite" into (i.e., deform or grip) the overmold portion 21 of the cable assembly 20, thereby providing strain-relief so that external forces such as pulling forces are not directed to the connector 22 of the connector assembly. Consequently, disturbance to the connection near the bulkhead adapter is inhibited. Further, the connector assembly 100 may be easily removed by disengaging the coupling body 60 and then sliding the inner housing 50 rearward for accessing the connector 22 for disconnection.

Figure 5C:
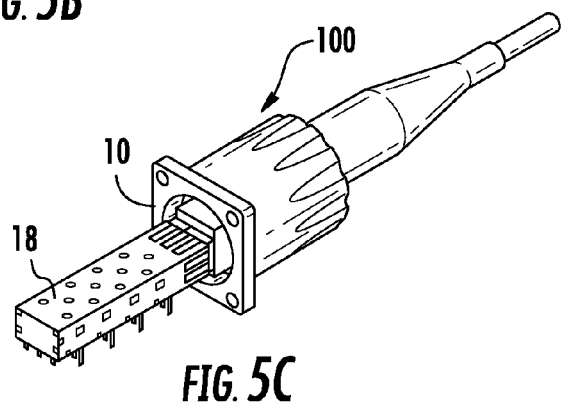

The concepts of the connector assembly are advantageous since it may be adapted for any suitable types and sizes of connectors/connections and/or adapted for different sizes/configurations of adapters or the like. By way of example, FIGS. 5A-5C depict the connector assembly 100 being connected to another device near the bulkhead adapter 10. Specifically, connector 22 is a multi-fiber optical connector for mating with a transceiver 18 that converts optical signals to electrical signals and vice versa. Transceiver 18 may be any suitable transceiver as desired such as a small form-factor pluggable (SFP) or a XFP transceiver. As depicted, transceiver 18 may include a transceiver body 18a that fits slot or cage 18b so that the transceiver body 18a (i.e., operational electronics) may be removed and replaced if desired. As shown in FIG. 5C, connector 22 is a multi-fiber optical connector is mated to transceiver 18 that converts the optical signals to electrical signals and vice versa. Still other variations are possible for connecting connectors to transceivers. Illustratively, FIG. 6 is a cross-sectional view of a connector assembly 100' having another optical connector type attached to transceiver 18 near the bulkhead adapter 10. Connector assembly 100' is similar to connector assembly 100, but uses a different connector interface with a cable assembly 20'. In this embodiment, the connectors 22 of cable assembly 20' are configured as two single-fiber optical connectors such as a transmit and receive pair of connectors. By way of example, the optical connectors may be LC type single-fiber connectors, but other types of connectors such as SC connectors may be used.

Other arrangements or configurations are possible for using the connector assemblies disclosed. For instance, the connector assemblies may be mated to each other for an in-line connection. By way of example, FIGS. 7A and 7B respectively depict an assembled and exploded view of the connector assembly 100 being attached to a second connector assembly 100 using an adapter housing 170. Adapter housing 170 is a sleeve having suitable flanges and protrusions (not numbered) on each end for engaging with respective coupling bodies 60 of each connector assembly 100. As shown in FIG. 7B, adapter 12 may be included within the adapter housing 170 for aligning and mating the respective optical connectors 22 of each cable assembly 100 for optical connectivity.

Other variations are possible that modify one or more components of the connector assemblies such as a component of the inner housing. By way of example, FIGS. 8-10 respectively depict perspective views of another design. Connector assembly 100" is similar to connector assembly 100, but uses a modified sealing element. Specifically, FIG.

Figure 8:
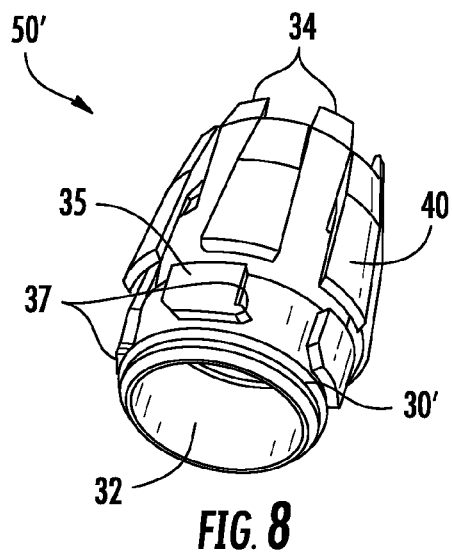
FIGS. 8-10 respectively depict perspective views of a sealing element (FIG. 8) of another connector assembly, along with a complimentary bulkhead adapter (FIG. 9) and the attachment of the sealing element to the bulkhead adapter (FIG. 10)
Figure 9:
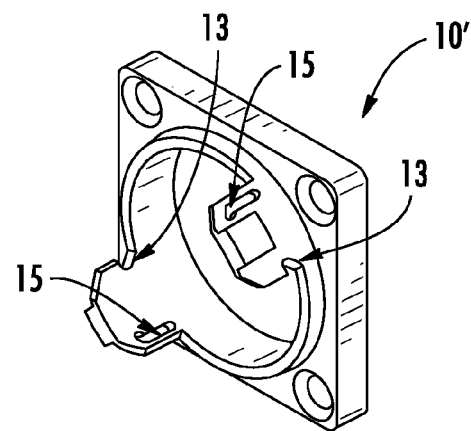
Figure 10:
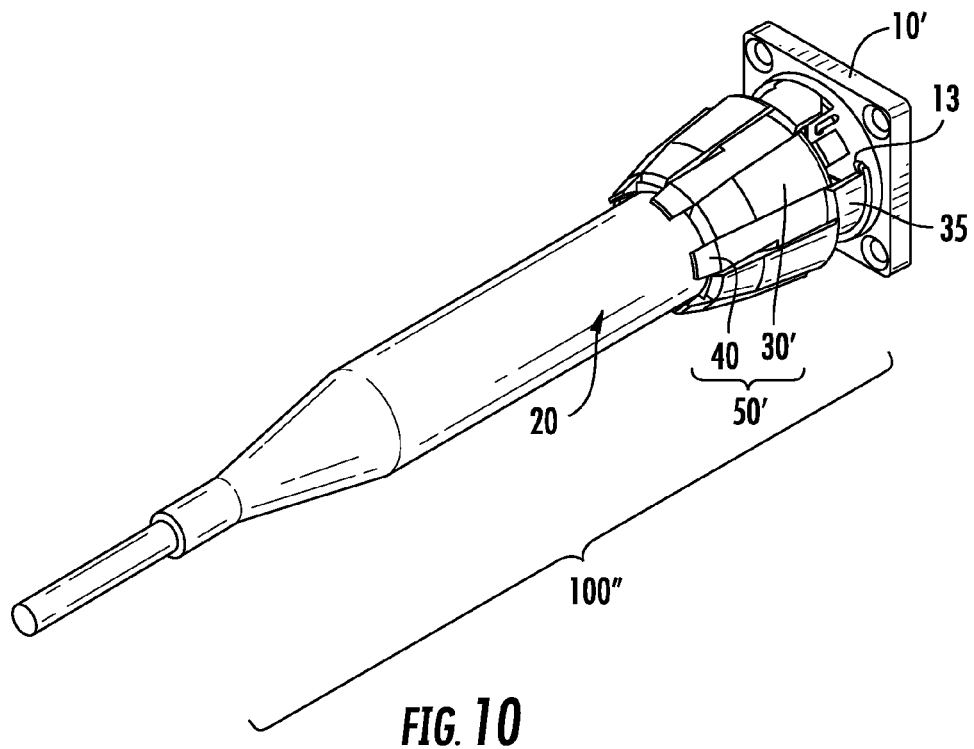
Figure 11:
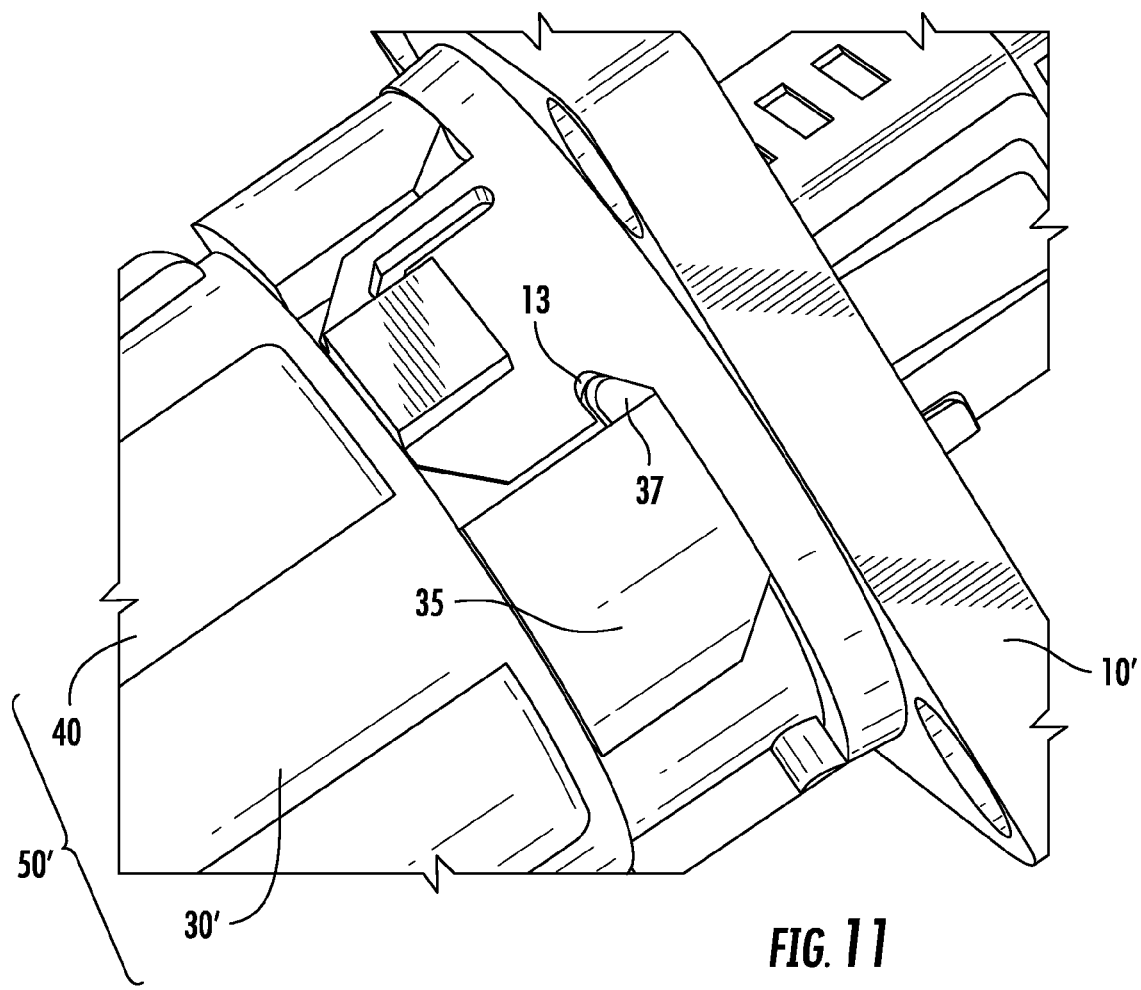
FIG. 11 is a close-up view of the attachment of the sealing element to the bulkhead adapter of FIG. 10.

8 depicts another inner housing 50' having a sealing element 30' with a securing feature that provides a positive mechanical retention for the connector assembly 100". The securing feature inhibits inadvertent forces on the connector 22 and/or removal of the inner housing 50' when disconnecting the coupling body of connector assembly 100' from the bulkhead adapter 10' or the like. As shown in FIG. 8, sealing element 30' includes at least lug 35 having at least one hook 37. The respective lugs 35 and hooks 37 are located near the front end of the sealing element 30' and engage complimentary structure on a complimentary bulkhead adapter 10' shown in FIG. 9. In this example, the sealing element 30' includes a plurality of lugs 35 each having a respective hook 37 for engaging a respective notch 13 on a respective flange of bulkhead adapter 10'. The sealing element 30' may include more lugs 35 with hooks 37 than flanges on the bulkhead adapter 10', thereby allowing the attachment of the sealing element 30'/inner housing 50' to the bulkhead adapter 10' in one of several rotational orientations for flexibility and allowing installation in a relaxed torsional nature for the connector assembly. Attachment of the sealing element 30' to the bulkhead adapter 10' requires proper alignment of the lug(s) 35 on the sealing element 30' with respect to the flanges of the bulkhead adapter 10' and then rotating the sealing element 30' with respect to the bulkhead adapter 10' so the hook(s) 37 engage notch(es) 13. FIG. 10 shows a perspective view of the inner housing 50' of connector assembly 100" attached to bulkhead adapter 10' so that the hook(s) 37 of lug(s) 35 engages the notch(es) 13 on flange of the bulkhead adapter 10'. FIG. 11 is an enlarged perspective view of FIG. 10 showing the attachment of inner housing 50' to the bulkhead adapter 10' using the hook 37 and notch 13. It is noted that the coupling body 60 is not shown in FIGS. 10 and 11, but would be included as with the other connector assemblies.

Figure 12:
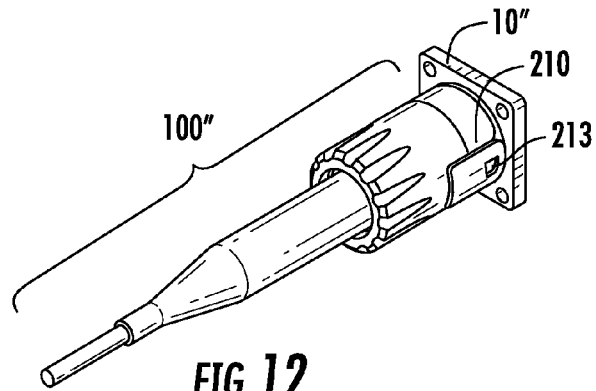
FIG. 12 depicts a perspective view of the connector assembly attached to another bulkhead adapter using an interface adapter and FIG. 13 depicts a partially exploded view of the connector assembly of FIG. 12 with the interface adapter.
Figure 13:
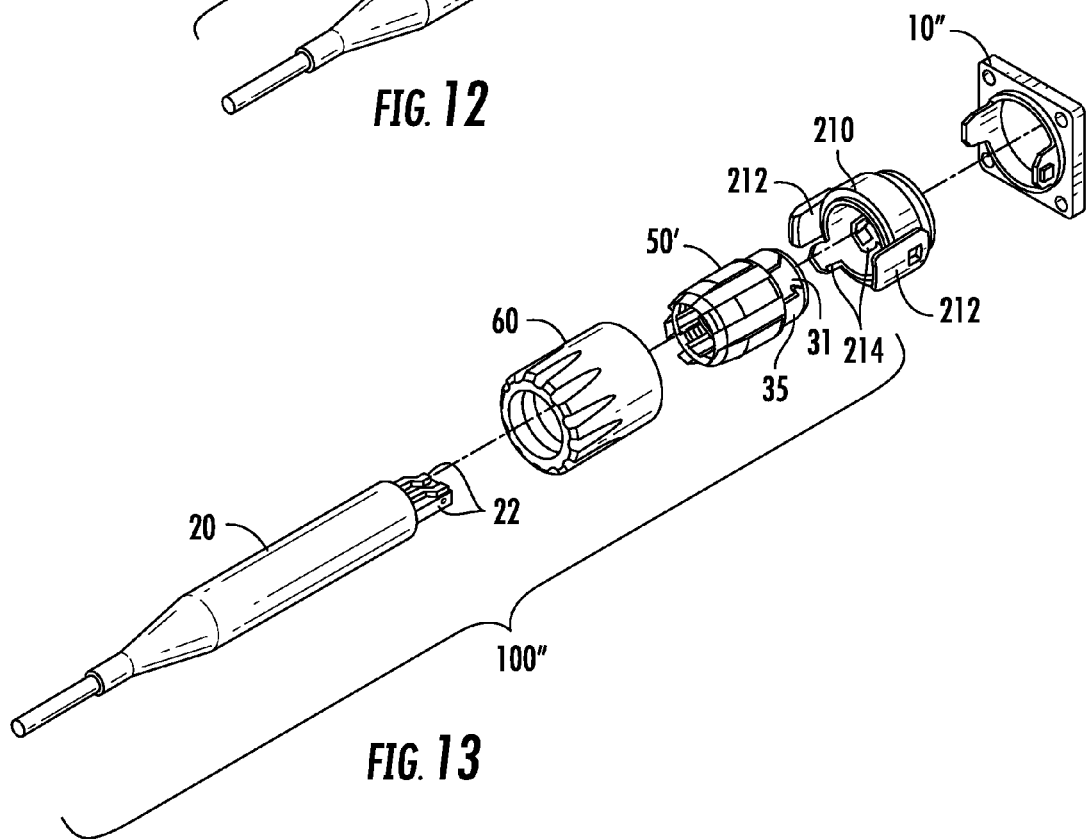
Figure 14:
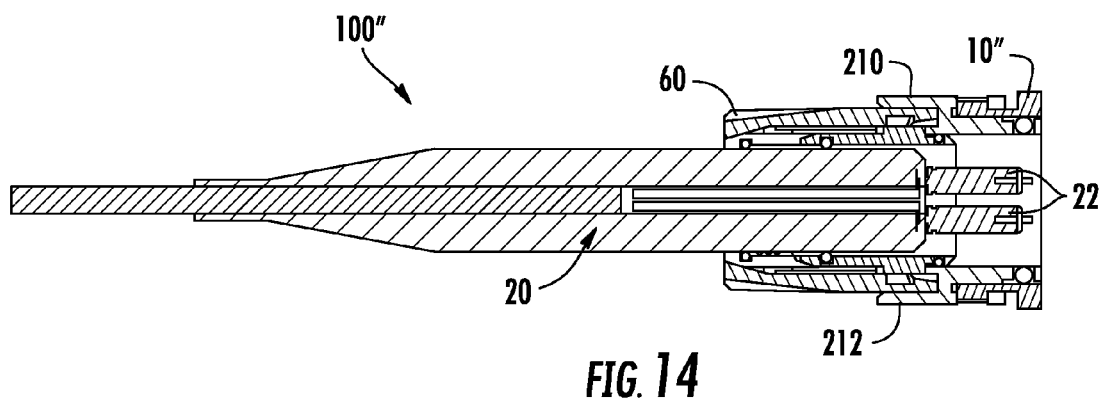
FIG. 14 is a cross-sectional view of FIG. 12 showing the connector assembly attached to the another bulkhead adapter using the interface adapter.

The connector assemblies disclosed may use other intermediary components for changing the size and/or making the connector assembly backwards compatible with existing bulkhead adapters that are already installed in certain applications. FIG. 12 depicts a perspective view of connector assembly 100" attached to another bulkhead adapter 10" using an interface adapter 210. FIG. 13 depicts a partially exploded view of the connector assembly 100" attached to bulkhead adapter 10" using interface adapter 210. By way of example, bulkhead adapter 10" has a larger opening/diameter than what is compatible for direct coupling with connector assembly 100". Consequently, the use of interface adapter 210 allows connector assembly 100" to still connect with the larger bulkhead adapter 10" by bridging the mismatch therebetween, thereby allowing the use of the connector assemblies with different sized bulkhead adapters. As shown, interface adapter 210 has one or more outer flanges 212 and one or more inner flanges 214 for bridging the mismatch between bulkhead adapter 10" and connector assembly 100". Outer flanges 212 of interface adapter 210 include securing features 213 such as openings or windows (not numbered) for engaging with the protrusions on the flanges of bulkhead adapter 10", thereby securing the two components. Inner flanges 214 of interface adapter 210 are similar to the flanges on bulkhead adapter 10' and allow the hook(s) 37 on respective lug(s) 35 of inner housing 50' to engage and secure the notch(es) on the inner flanges 214 of the interface adapter 210. FIG. 14 is a cross-sectional view of FIG. 12 showing the connector assembly 100" attached to the bulkhead adapter 10" using the interface adapter 210.

Figure 15:
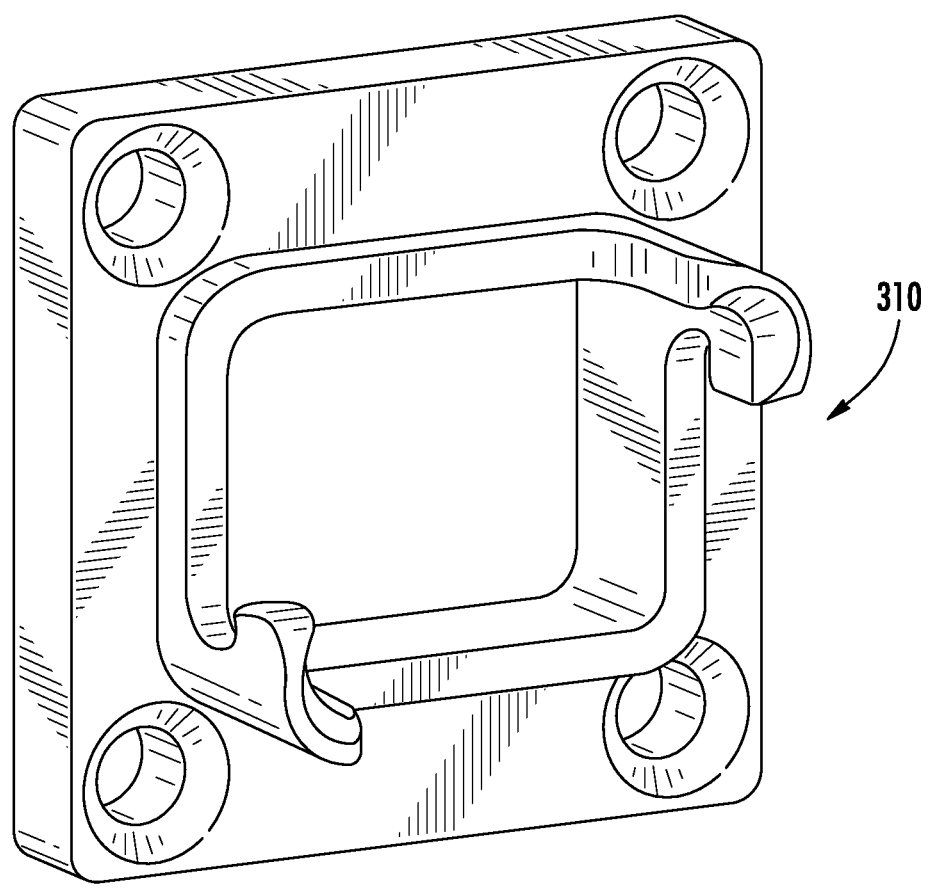
FIG. 15 is a perspective view of another bulkhead adapter having a non-round interface.

Still other variations of the concepts disclosed are possible. For instance, the concepts of the application may be modified for use with non-round interfaces. By way of explanation, the coupling body and inner housing of the connector assembly can have generally rectangular cross-sections for use with a complimentary cable assembly having a suitable sized rectangular overmold portion. The operation is the similar to the round configurations shown with the sealing element sized for providing sealing to the bulkhead adapter along with sealing to the overmold portion and with the crank providing strain-relief with portions of the arms "biting" into the overmold portion of the cable when driven by the coupling body which is also adapted to be rectangular and fit the bulkhead adapter. However, in this embodiment the arms of the crank would be located on one or more sides of the generally rectangular crank. For instance, the arms could be located on opposite sides of the crank for engaging the overmold portion on opposite sides and evenly providing strain-relief to the opposite sides, but other variations are possible. FIG. 15 depicts a perspective view of a bulkhead adapter 310 having a non-round interface.

Although the disclosure has been illustrated and described herein with reference to embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. A connector assembly, comprising:
   a cable assembly comprising a cable with an overmold portion and a connector;
   an inner housing assembly having a sealing element and a crank for providing strain-relief, the sealing element comprising a longitudinal passageway extending from a front end to a rear end for receiving a part of the overmold portion within the longitudinal passageway; and
   a coupling body comprising a passageway that fits about part of the inner housing, the passageway comprises an attachment feature for securing the coupling body and a clamping feature for engaging the crank,
   wherein the crank having a plurality of arms are connected by a ring and the sealing element has a plurality of fingers near a rear end, and wherein the ring fits into the longitudinal passageway of the sealing element for attaching the crank to the sealing element and the plurality of arms of the crank are at least partially interleaved between the plurality of fingers on the sealing element.

2. The connector assembly of claim 1, wherein the crank attaches to the sealing element.

3. The connector assembly of claim 2, wherein the plurality of arms are deflectable.

4. The connector assembly of claim 2, at least some of the plurality of arms having one or more teeth for gripping the overmold portion of the cable assembly.

5. The connector assembly of claim 1, the sealing element having at least one lug with at least one hook.

6. The connector assembly of claim 1, further including one or more O-rings.

7. The connector assembly of claim 1, further including a first O-ring disposed on an outer surface of the sealing element and a second O-ring disposed on an inner surface of the sealing element.

8. The connector assembly of claim 1, the clamping feature being a tapered region in the passageway of the coupling body.

9. The connector assembly of claim 1, the connector being an optical connector, an electrical connector, or a hybrid optical-electrical connector.

10. The connector assembly of claim 1, the connector being attached to a bulkhead adapter.

11. The connector assembly of claim 1, the connector being attached to another connector assembly using an adapter housing.

12. The connector assembly of claim 1, further including an interface adapter.

13. The connector assembly of claim 1, the connector being a first LC optical connector and a second LC optical connector.

14. A connector assembly, comprising:
   a cable assembly comprising a cable with an overmold portion and a connector;
   an inner housing assembly comprising a sealing element and a crank for providing strain-relief, the sealing element comprising a longitudinal passageway extending from a front end to a rear end for receiving a part of the overmold portion within the longitudinal passageway, and the crank comprising a plurality of arms connected by a ring and the sealing element has a plurality of fingers near a rear end, wherein the ring fits into the longitudinal passageway of the sealing element for attaching the crank to the sealing element and the plurality of arms of the crank are at least partially interleaved between the plurality of fingers on the sealing element; and
   a coupling body comprising a passageway that fits about part of the inner housing, the passageway comprises an attachment feature for securing the coupling body and a clamping feature for engaging the crank.

15. The connector assembly of claim 14, wherein the plurality of arms are deflectable.

16. The connector assembly of claim 14, at least some of the plurality of arms having one or more teeth for gripping the overmold portion of the cable assembly.

17. The connector assembly of claim 14, the sealing element having at least one lug with at least one hook.

18. The connector assembly of claim 14, further including one or more O-rings.

19. The connector assembly of claim 14, further including a first O-ring disposed on an outer surface of the sealing element and a second O-ring disposed on an inner surface of the sealing element.

20. The connector assembly of claim 14, the clamping feature being a tapered region in the passageway of the coupling body.

21. The connector assembly of claim 14, the connector being an optical connector, an electrical connector, or a hybrid optical-electrical connector.

22. The connector assembly of claim 14, the connector being attached to a bulkhead adapter.

23. The connector assembly of claim 14, the connector being attached to another connector assembly using an adapter housing.

24. The connector assembly of claim 14, further including an interface adapter.

25. The connector assembly of claim 14, the connector being a first LC optical connector and a second LC optical connector.

26. A method of attaching a connector assembly, comprising:
   providing a cable assembly comprising a cable with an overmold portion and a connector;
   providing an inner housing assembly comprising a sealing element and a crank, the crank having a plurality of arms connected by a ring, the sealing element having a plurality of fingers near a rear end and comprising a longitudinal passageway extending from a front end to a rear end;
   attaching the crank to the sealing element by fitting the ring into the longitudinal passageway of the sealing element such that the plurality of arms of the crank are at least partially interleaved between the plurality of fingers on the sealing element;
   sliding the inner housing assembly about a part of the overmold portion so it is within the longitudinal passageway;
   providing a coupling body comprising a passageway that fits about part of the inner housing, wherein the passageway comprises an attachment feature and clamping feature, and sliding the coupling body about the inner housing so that the clamping feature engages the crank onto the overmold portion; and
   securing the coupling body using the attachment feature.

* * * * *